United States Patent [19] [11] 3,979,540
Moffett [45] Sept. 7, 1976

[54] IONOMER RESIN SUBSTRATES COATED WITH AN EPOXY PRIMER AND FINISHED WITH AN ACRYLIC COATING

[75] Inventor: Walter K. Moffett, Birmingham, Mich.

[73] Assignee: E. I. Du Pont de Nemours and Company, Wilmington, Del.

[22] Filed: Dec. 22, 1975

[21] Appl. No.: 643,394

[52] U.S. Cl. .................. 428/159; 428/315; 428/321; 428/414
[51] Int. Cl.² .................. B32B 3/26
[58] Field of Search .......... 428/315, 321, 322, 413, 428/412, 414, 159

[56] References Cited
UNITED STATES PATENTS

| | | | |
|---|---|---|---|
| 3,264,272 | 8/1966 | Rees | 260/78.5 |
| 3,558,564 | 1/1971 | Vasta | 260/77.5 |
| 3,686,067 | 8/1972 | Williams | 428/313 |
| 3,758,992 | 9/1973 | Olson | 428/315 |
| 3,816,234 | 6/1974 | Burden | 428/322 |
| 3,841,895 | 10/1974 | Hick | 260/29.6 R |
| 3,843,390 | 10/1974 | Hudson et al. | 428/412 |
| 3,868,343 | 2/1975 | Stengle et al. | 260/29.4 R |

Primary Examiner—William J. Van Balen

[57] ABSTRACT

A coated flexible substrate of
a. a layer of a foamed ionomer resin or a foamed polyolefin resin,
b. a top layer of an ionomer resin that is firmly adhered to the foamed layer,
c. an epoxy primer layer firmly adhered to the top layer, and
d. an acrylic coating layer in firm adherence to the primer layer;

Typical ionomer resins used in this substrate are copolymers of ethylene/methacrylic acid in which the carboxylic acid groups are ionized by neutralization with metal ions such as zinc ions or sodium ions;

The coated substrate is formable, has excellent weatherability and durability and is useful as roof covering for automobiles.

15 Claims, No Drawings

IONOMER RESIN SUBSTRATES COATED WITH AN EPOXY PRIMER AND FINISHED WITH AN ACRYLIC COATING

BACKGROUND OF THE INVENTION

This invention is related to coated substrates and in particular to a coated flexible substrate having a durable finish.

Currently, the automotive industry is utilizing polyvinyl chloride coated sheet materials as a decorative roof coating for automobiles. These vinyl roofs, which is the term commonly used in the industry, have a number of drawbacks. Vinyl strips are cut and sewn together to provide a complete roof cover that has the same contour as the automobile roof. Generally, several men are required to install these vinyl roofs. The above add substantially to the costs of a vinyl roof on an automobile. A low cost high quality decorative roof that can be easily installed with a minimum of labor is desired by the automotive and truck manufacturing industry.

SUMMARY OF THE INVENTION

The coated flexible substrate of this invention is of
a. a layer of a foamed ionomer resin or a foamed polyolefin resin;
b. a top layer of an ionomer resin firmly adhered to the foamed layer;
c. an epoxy primer layer firmly adhered to the top layer, and
d. an acrylic coating layer which is a finish for the substrate in firm adherence to the primer layer.

DESCRIPTION OF THE INVENTION

The coated flexible substrate has a number of advantages over the polyvinyl chloride coated sheet materials currently used as vinyl roofs for automobiles. A large sheet of the coated flexible substrate can be molded into the shape of an auto roof and can be installed on an automobile with a substantial reduction in manpower in comparison to the current installation of a vinyl roof which results in a substantial savings. Patterns, designs and seams can be molded into the substrate to improve its appearance. The acrylic coating layer of the flexible substrate is durable and weatherable and can be provided in a large variety of colors that can match or contrast the color of the remainder of the automobile.

A typical cross-section of the flexible substrate of this invention adhered to a metal substrate is as follows:

Metal substrate
Adhesive Layer
Foamed layer of Ionomer Resin or Polyolefin Resin
Top layer of Ionomer Resin
Epoxy Primer
Acrylic Coating Layer The foamed layer of the flexible substrate gives a resilient leather-like feel and touch to the resulting finished auto roof. This foamed layer can either be of a foamed ionomer resin or of a foamed polyolefin resin. The foamed layer is about 1–100 mils thick but usually is about 10–40 mils thick. Under some circumstances, it may be possible to eliminate the foamed layer.

The foamed layer of either the ionomer resin or the polyolefin resin is prepared by convention foaming techniques well known in the art, such as foaming with a Freon gas or a foaming agent. It is preferred that the foam structure be closed cell structure to eliminate water seepage into the foamed layer that can cause delamination from the metal auto roof and corrosion of the auto roof. Generally, the cells are about 5 to 20 mils in diameter and the foam has a density of about 2–20 pounds per cubic foot.

For most applications, a polyethylene resin is the polyolefin resin that is used. Other resins such as polypropylene also can be used. If a polyolefin foam is used, a suitable adhesive is used to bond the ionomer top layer to the foam layer.

The ionomer resin used for both the foamed layer and the top layer is a copolymer of about 75–98% by weight of ethylene and 2–25% by weight of an $\alpha,\beta$-unsaturated monocarboxylic acid having 3–8 carbon atoms. The copolymer has about 10 to 90% of the carboxylic acid groups ionized by neutralization with metal ions having an ionizing valence of about 1 to 3 and these groups are distributed throughout the copolymer.

The ionomer resins are prepared according to the teachings of Rees, U.S. Pat. No. 3,264,272, issued Aug. 2, 1966. This patent is hereby incorporated by reference into this application.

Particularly useful ionomer resins are copolymers of ethylene and methacrylic acid having 10–60% of the carboxylic acid groups ionized with zinc or sodium ions. Typical examples of these ionomer resins are as follows:

88% by weight ethylene/12% by weight methacrylic acid copolymer having 46% of the acid groups ionized with zinc ions;

90% by weight ethylene/10% by weight methacrylic acid copolymer having 71% of the acid groups ionized with zinc ions;

90% by weight ethylene/10% by weight methacrylic acid copolymer having 50% of the acid groups ionized with sodium ions;

91% by weight ethylene/9% by weight methacrylic acid copolymer having 18% of the acid groups ionized with zinc ions.

The top layer of the ionomer resin is about 1–50 mils in thickness but usually is about 5–30 mils thick.

The top layer is applied over the foam layer by melt extrusion of the ionomer resin onto the foam layer. Other techniques can be used to apply the top layer. For example, a sheet of the ionomer resin can be laminated to the foam layer with heat or with the use of an adhesive. The resulting substrate of foam layer and top layer can be embossed, for example, to provide a grain pattern or seams or both by conventional embossing techniques. The substrate also can be molded into a desired form. For example, if the substrate is to be used to cover an automobile roof, it can be molded into the shape that will cover an entire automobile roof.

The top layer of the above substrate is then coated with an epoxy primer and dried and cured. The resulting primer layer is about 0.1–5 mils thick; generally about 0.3–1.0 mil thick layer is used. The epoxy primer is of a epoxy hydroxy polyether resin. One useful resin is of the formula

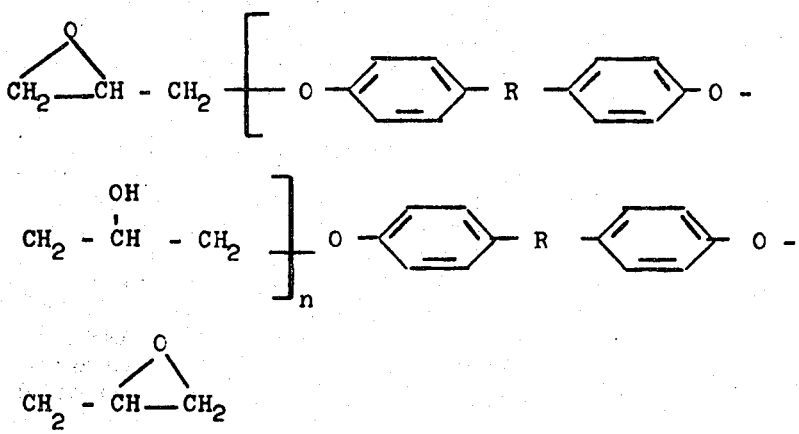

where R is an alkylene group and $n$ is an integer sufficiently large to provide a weight average molecular weight of about 40,000–200,000. In one particularly useful resin R is

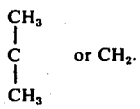

The epoxy primer usually contains conventional crosslinking agents. One particularly useful crosslinking agent is a polyamide resin having reactive amine groups. The primer can contain plasticizers and other modifiers and can be pigmented with conventional pigments that are commonly used.

It is possible to apply the acrylic coating composition directly to the primer layer without drying and curing the primer if proper solvents are used.

One acrylic coating composition used for the acrylic coating layer is an enamel that forms a crosslinked but flexible finish. The enamel and its preparation are disclosed in Hick, U.S. Pat. No. 3,841,895, issued Oct. 15, 1974, which is hereby incorporated by reference into this application.

This acrylic enamel is of
1. an acrylic polymer of methyl methacrylate or styrene or a mixture thereof, an alkyl acrylate or an alkyl methacrylate having 2–12 carbon atoms in the alkyl groups, a hydroxy alkyl acrylate or methacrylate having 2–4 carbon atoms in the alkyl group and an α,β-ethylenically unsaturated monocarboxylic acid and
2. a heat reactive condensate or an organic polyisocyanate.

One preferred enamel which forms a high quality finish is of
1. 70–95 percent by weight of an acrylic polymer of
  a. 19–44 percent by weight, based on the weight of the acrylic polymer, of styrene or an alkyl methacrylate having one to four carbon atoms in the alkyl group;
  b. 50–75 percent by weight, based on the weight of the acrylic polymer, of an alkyl methacrylate having 6–12 carbon atoms in the alkyl group, or an alkyl acrylate having 2–12 carbon atoms in the alkyl group or a mixture of these constituents;
  c. 5 to 20 percent by weight, based on the weight of the acrylic polymer, of a hydroxy alkyl acrylate or methacrylate having two to four carbon atoms in the alkyl group; and
  d. 1 to 20 percent by weight, based on the weight of the acrylic polymer, of an α,β-ethylenically unsaturated carboxylic acid;
2. 5–30 percent by weight, based on the weight of the film-forming constituents, of a compatible crosslinking agent which is either an alkylated melamine formaldehyde resin having one to eight carbon atoms in the alkyl group or a polyisocyanate.

The following is one preferred acrylic polymer used in the enamel:
   20 to 32 percent by weight of methyl methacrylate,
   55 to 65 percent by weight of butyl acrylate,
   8 to 12 percent by weight of hydroxyethyl acrylate,
   1 to 5 percent by weight of acrylic acid or methacrylic acid.

One particularly preferred polymer that gives a high quality finish is 61 percent butyl acrylate, 26 percent methyl methacrylate, 10 percent 2-hydroxyethyl acrylate and 3 percent acrylic acid.

One useful polyisocyanate is the biuret of hexamethylene diisocyanate.

Plasticizers and other conventional additives can be incorporated onto the enamel. Generally, the enamel is pigmented with conventional pigments, such as metallic oxides, preferably titanium dioxide, zinc oxide, iron oxide, and the like, metallic flakes, such as aluminum flake, metallic powders, metallic hydroxides, "Afflair" pigments, i.e., mica coated with titanium dioxide, sulfates, carbonates, carbon blacks, silica, talc, china clay and other pigments, organic dyes and lakes.

Another useful acrylic coating composition is of an acrylic polymer crosslinked with a polyisocyanate. This composition is disclosed in Vasta, U.S. Pat. No. 3,558,564, issued Jan. 26, 1971, that is hereby incorporated by reference into this application.

This acrylic coating composition is of
1. an organic polyisocyanate and
2. an acrylic polymer in which the backbone consists essentially of polymerized acrylic esters of the group of alkyl methacrylate or alkyl acrylate, or mixtures thereof, each having 1–12 carbon atoms in the alkyl groups and having polymerized ethylenically unsaturated ester units that form ester groups pending from the carbon atoms of the backbone that comprise about 10 to 25% of the total weight of the polymer and are of ester group (A)

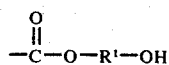

and ester group (B) which is either

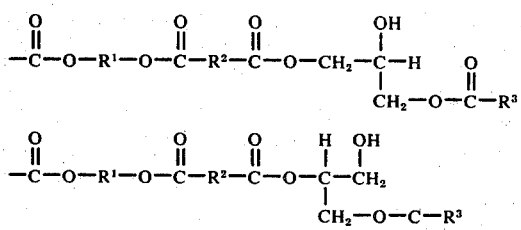

or a mixture of these groups; wherein the molar ratio of ester group (A) to ester group (B) is from about 1:1.5 to 1:2.5; and wherein
- $R^1$ is a saturated hydrocarbon radical having 2-4 carbon atoms,
- $R^2$ is an aromatic radical, and
- $R^3$ is tertiary hydrocarbon group having 8 through 10 carbon atoms.

One particularly useful composition which forms a high quality finish of the above type is of
a. the biuret of hexamethylene diisocyanate and
b. an acrylic polymer of styrene/methyl methacrylate/hydroxy ethyl acrylate/phthalic anhydride/a mixed glycidyl ester of synthetic tertiary carboxylic acids of the formula

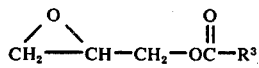

where $R^3$ is a tertiary aliphatic hydrocarbon of 8-10 carbon atoms; wherein the acrylic polymer has the aforementioned pendent ester groups (A) and (B).

Conventional pigments, plasticizers and other additives and modifiers can be added to the above composition. Usually, the composition is pigmented with one of the previously mentioned pigments.

The acrylic coating composition is applied by conventional techniques such as brushing, spraying, dipping, flow coating and the like, and either dried and cured at ambient temperatures or at elevated temperatures of 50°–100°C. for 2–20 minutes. The resulting acrylic coating layer is about 0.5–10 mils thick. Usually about a 1–5 mils thick layer is applied.

Application of the epoxy primer coat to the substrate is accomplished by one of the above techniques and is dried and cured under the above conditions. Then the acrylic composition is applied dried and cured as stated above. The substrate then can be applied for example to an auto body roof using a conventional adhesive. The resulting roof has excellent durability and weatherability because of the durable nature of the finish of the epoxy primer and the acrylic top coat.

An ionomer sheet of the above resin without the foam layer can be finished with the above primer and acrylic composition. For example, these finished sheets can be used as splash guards and gravel deflectors for automobiles and trucks, the thickness of the primer layer and the acrylic layer are the same as above. It is preferred to use the flexible acrylic composition as the finish in this type of application for good durability.

The following Examples illustrate the invention. The parts and percentages are by weight unless otherwise specified.

EXAMPLE 1

An epoxy primer is prepared by first forming a pigment dispersion and then this dispersion with film-forming constituents to form the primer.

A white pigment dispersion is prepared as follows:

| Portion 1 | Parts by Weight |
|---|---|
| Epoxy Resin solution (70% solids epoxy resin in a solvent mixture of xylene and ethylene glycol monoethyl ether) | 16.03 |

The epoxy resin has the following structural formula:

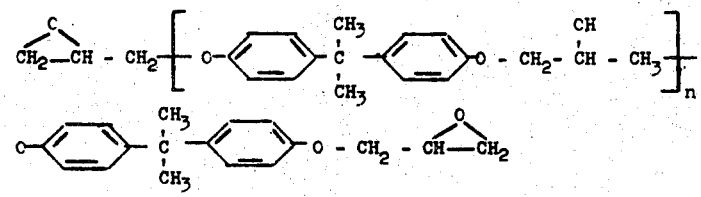

$n$ is a positive integer sufficiently large to provide a Gardner-Holdt viscosity of $Z_1$ to $Z_2$ measured at the above solids at 25°C and has an epoxy equivalent of 425–450. The epoxy equivalent is the grams of resin containing 1 gram equivalent of epoxide.

| | |
|---|---|
| Urea formaldehyde solution (60% solids in butanol of urea formaldehyde having a Gardner-Holdt viscosity at 25°C of Y½ to Z 2½.) | 0.76 |
| Ethylene glycol monoethyl ether | 7.47 |
| Xylene | 15.14 |
| Hydrocarbon solvent | 6.06 |
| Portion 2 | |
| Silicone dioxide pigment | 0.49 |
| Portion 3 | |
| Talc pigment | 13.65 |
| Titanium dioxide pigment | 15.56 |
| Parytes pigment | 24.84 |
| Total | 100.00 |

Portion 1 is charged into a mixing vessel and thoroughly mixed. Portion 2 is added and mixed for 10 minutes and then Portion 3 is added and mixed for 30 minutes. The resulting mixture is charged into a conventional sand mill and ground at a rate of 50 gallons per hour to a 1 mil fineness.

An epoxy primer is prepared as follows:

| Portion 1 | Parts by Weight |
|---|---|
| White pigment dispersion (prepared above) | 2437.0 |
| Silicone solution (1% solids in xylene) | 3.8 |
| Ethylene glycol monoethyl-ether | 33.2 |
| Xylene | 80.0 |
| Portion 2 | |
| Xylene | 340.0 |
| Polyamide solution (80% solids of "Versamid" 100 polyamide in xylene/ethylene glycol monoethyl-ether and having a Gardner-Holdt viscosity at 25°C of E' wherein the polyamide has an amine value of 85-95, weight percent of amine 2.57% and an amine equivalent weight of 6.22) | 377.5 |
| Portion 3 | |
| Xylene | 37.5 |
| Total | 3309.0 |

Portion 1 is charged into a mixing vessel and thoroughly mixed. Portion 2 is added and mixed and then Portion 3 is added and thoroughly mixed to form a primer.

A flexible acrylic topcoating composition is prepared as follows:

| Portion 1 | Parts by Weight |
|---|---|
| Acrylic Resin solution (55% solids of an acrylic polymer of butyl acrylate/ methyl methacrylate/ 2 ethyl-hexylacrylate/acrylic acid in a weight ratio of 61/26/10/3 in butanol having a Gardner-Holdt viscosity of x - z measured at the above solids and at 25°C) | 144.17 |
| Carbon Black Dispersion (38% solids of the above acrylic polymer and carbon black pigment in butanol and having a pigment volume concentration of 9%) | 357.06 |
| Portion 2 | |
| Acrylic polymer solution (60% solids of a polymer of butylacrylate/styrene/2ethyl-hexyl/acrylate in a solvent mixture of xylene/hydrocarbon solvent/butanol in a 48/45/7 ratio having a Gardner-Holdt viscosity of x - z measured at 250°C and at the above solids) | 138.17 |
| Silicone Dispersion (1% solids-xylene) | 1.00 |
| Toluene | 26.01 |
| Methyl ethyl/ketone | 96.59 |
| Total | 763.00 |

Portion 1 is charged into a high speed mixer and mixed for 30 minutes and then Portion 2 is added and mixed for 1 hour.

An activator solution is prepared as follows:

| | Parts by Weight |
|---|---|
| Ethyl acetate | 451.17 |
| Biuret solution (75% solids of the biuret of hexamethylene diisocyanate in ethylene glycol monoethyl ether acetate and xylene). | 350.83 |
| Total | 802.00 |

A foam sheet structure about 30 mils thick having a closed cell foam structure with cells about 8–15 mils, in diameter is prepared from an ionomer resin using a conventional foaming technique in which Freon is used as a blowing agent. This ionomer resin is a copolymer of 90% ethylene/10% methacrylic acid copolymer which is 71% neutralized with a zinc compound and the resulting resin contains 10% by weight zinc. The resin is made according to the teachings of U.S. Pat. No. 3,264,272.

A top layer about 5 mils thick of the above ionomer resin is extruded onto the above foam sheet structure. The resulting sheet structure is then heat embossed using conventional embossing techniques to provide the top layer with a grain pattern. The embossed sheet structure is then heat formed into a shape which fits the roof of an automobile.

The above prepared epoxy primer is sprayed onto the top layer of the embossed sheet structure and dried at about 72°C for 10 minutes giving a primer layer about ½ mil in thickness.

The above flexible acrylic topcoating composition is reduced 50% by volume with a 2:1 solvent mixture of ethyl acetate and ethylene glycol monoethyl ether acetate. Then 15% by volume of the above prepared activator solution is added. The resulting composition is sprayed onto the above primed-embossed sheet structure and dried under the above conditions giving an acrylic topcoating about 2 mils thick.

The resulting finish is flexible and durable, has excellent adhesion to the substrate and is weatherable. The above finished sheet structure is bonded to a steel auto roof with an adhesive and forms a durable weatherable high quality roof for the automobile.

A second sheet structure is prepared as above except a polyethylene foam is used and the top layer is an ionomer resin which is a copolymer of 90% ethylene/10% methacrylic acid which is 50% neutralized with a sodium compound and contains about 10% sodium. The sheet structure is embossed and heat formed as above and primed and topcoated as above. The resulting finish is flexible and durable and has excellent adhesion to the substrate and is weatherable. The finished sheet is bonded to a steel auto roof with an adhesive and forms a high quality roof.

A gravel deflector for automobiles is molded from an ionomer resin. This resin is a copolymer of 88% ethylene/12% methacrylic acid copolymer which is 46% neutralized and contains 12% by weight zinc. The resin is made according to the teachings of U.S. Pat. No. 3,264,272.

The above prepared epoxy primer is sprayed onto both sides of the gravel deflector and dried and cured at about 72°C. for 10 minutes giving a primer layer about ½ mil in thickness.

The above flexible acrylic topcoating composition is reduced as above and blended with the activator solution as above. The resulting composition is sprayed onto the above primed gravel deflector and dried and cured under the above conditions giving topcoating about 2 mils thick.

The finish on the gravel deflector has excellent adhesion to the substrate, good flexibility and excellent resistance to effects of gravel under hot and cold temperature conditions.

EXAMPLE 2

A polyurethane coating composition is prepared as follows:

| | Parts by Weight |
|---|---|
| White pigment dispersion (71% solids in ethylene glycol monoethyl ether acetate of an acrylic polymer binder of styrene/methyl methacrylate/hydroxy ethyl acrylate/"Cardura" E ester/phthalic anhydride in a weight ratio of 30/15/16.5/25.0/13.5 prepared according to Example 1 of U.S. Patent 3,558,564 and titanium dioxide pigment in a pigment to binder ratio of 545/100). "Cardura" E ester a mixed ester described in U.S. Patent 3,275,583 and is the glycidyl ester of a synthetic tertiary carboxylic acid of the formula $$CH_2\underset{\diagdown O \diagup}{-}CH-CH_2-O-\overset{O}{\underset{\|}{C}}-R^3$$ where $R^3$ is a tertiary aliphatic hydrocarbon of 8-10 carbon atoms. | 385.86 |
| Acrylic polymer solution (55% solids in ethylene glycol monoethyl ether acetate of the above acrylic polymer). | 437.30 |
| Silicone dispersion (1% silicone in ethylene glycol monoethyl ether acetate). | 2.23 |
| Ethyl acetate | 160.64 |
| Dibutyl tin dilaurate solution (containing 0.2% tin in ethyl acetate solvent). | 16.85 |
| Total | 1002.88 |

Three parts of the above composition are mixed with 1 part of the activator solution prepared in Example 1 to form a sprayable composition.

A foam sheet structure described in Example 1 of a foamed ionomer resin and an ionomer resin topcoat and which is embossed and formed into the shape of an auto roof is primed with the epoxy primer as in Example 1 to give a ½ mil thick primer coat. The above prepared sprayable composition is applied and dried at 72°C for 10 minutes to give a finish about 3 mils thick.

The resulting finish is durable and has excellent adhesion to the sheet structure and is weatherable. The above finished sheet structure is bonded to a steel auto top as in Example 1 and forms a durable and weatherable high quality roof.

A second foam sheet structure described in Example 1 of a foamed polyethylene resin and an ionomer resin topcoat and which is embossed and formed into an auto roof shape is primed with the epoxy primer as in Example 1 to give a ½ mil thick primer coat. The above prepared sprayable composition is applied and dried at 72°C for 10 minutes to give a finish about 3 mils thick.

The resulting finish is durable and has excellent adhesion to the sheet substrate and is weatherable. The above finished sheet structure is bonded to a steel auto roof as in Example 1 and forms a durable and weatherable high quality roof.

I claim:

1. A coated, flexible substrate consisting essentially of
   a. a layer of a foamed ionomer resin or of a foamed polyolefin resin,
   b. a top layer of an ionomer resin firmly adhered to said foamed layer,
   c. an epoxy primer layer firmly adhered to the top layer and
   d. an acrylic coating layer in firm adherence to the primer layer.

2. The coated substrate of claim 1 in which the ionomer resin is a copolymer of about 75-98% by weight of ethylene and 2-25% by weight of an α,β-unsaturated monocarboxylic acid having 3-8 carbon atoms, wherein the copolymer has from about 10 to 90% of the carboxylic acid groups ionized by neutralization with metal ions having an ionized valence of 1 to 3 inclusive distributed throughout the copolymer.

3. The coated substrate of claim 2 in which the ionomer resin is a copolymer of ethylene and methacrylic acid and the metal ions are sodium ions or zinc ions.

4. The coated substrate of claim 3 in which the epoxy primer is a pigmented crosslinked epoxy hydroxy polyether resin.

5. The coated substrate of claim 3 in which the acrylic coating is a flexible crosslinked enamel consisting essentially of
   a. an acrylic polymer of methyl methacrylate or styrene or a mixture thereof, an alkyl acrylate or an alkyl methacrylate having 2-12 carbon atoms in the alkyl groups, a hydroxy alkyl acrylate as a hydroxy alkyl methacrylate having 2-4 carbon atoms in the alkyl group and an α,β-ethylenically unsaturated monocarboxylic acid and
   b. a heat reactive condensate or an organic polyisocyanate.

6. The coated substrate of claim 3 in which the acrylic coating is a crosslinked polyurethane acrylic consisting essentially of the product of
   a. an organic polyisocyanate; and
   b. an acrylic polymer in which the backbone consists essentially of polymerized acrylic esters of the group of an alkyl methacrylate or an alkyl acrylate or mixtures thereof each having 1-12 carbon atoms in the alkyl group and having polymerized ethylenically unsaturated ester units that form ester groups pending from the carbon atoms of the polymer backbone and comprise about 10 to 75% of the total weight of the polymer and consisting essentially of ester group (A)

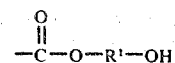

and ester group (B) selected from the group consisting of $$-\overset{O}{\underset{\|}{C}}-O-R^1-O-\overset{O}{\underset{\|}{C}}-R^2-\overset{O}{\underset{\|}{C}}-O-CH_2-\overset{OH}{\underset{|}{C}}-H \quad \overset{O}{\underset{\|}{\phantom{C}}}$$
$$\underset{CH_2-O-C-R^3}{}$$

$$-\overset{O}{\underset{\|}{C}}-O-R^1-O-\overset{O}{\underset{\|}{C}}-R^2-\overset{O}{\underset{\|}{C}}-O-\overset{H}{\underset{|}{C}}-\overset{OH}{\underset{|}{CH_2}} \quad \overset{O}{\underset{\|}{\phantom{C}}}$$
$$\underset{CH_2-O-C-R^3}{}$$

or mixtures thereof, wherein the molar ratio of ester group (A) to ester (B) is from about 1:1.5 to 1:2.5; and wherein
$R^1$ is a saturated hydrocarbon group having 2–4 carbon atoms,
$R^2$ is an aromatic radical,
$R^3$ is a tertiary hydrocarbon group having 8 through 10 carbon atoms.

7. The coated substrate of claim 6 in which the acrylic polymer backbone contains styrene in addition to the polymerized acrylic esters.

8. The coated substrate of claim 1 in which the foamed layer is a polyolefin and the polyolefin is polyethylene.

9. The coated flexible substrate of claim 1 in which
a. the foamed layer is an ionomer resin is a copolymer of 75–98% by weight of ethylene and 2–25% by weight of methacrylic acid having 10–60% of the carboxylic acid groups ionized with zinc or sodium metal ions;
b. the top layer of ionomer resin is the same as (a) above,
c. the epoxy primer is a pigmented epoxy hydroxy polyether resin crosslinked with an amine terminated polyamide,
d. the acrylic coating is an acrylic polymer or a blend of acrylic polymers in which the acrylic polymer is of methyl methacrylate or styrene or a mixture thereof, an alkyl methacrylate or an alkyl acrylate having 2–12 carbon atoms in the alkyl groups, a hydroxy alkyl acrylate or a hydroxy alkyl methacrylate having 2–4 carbon atoms in the alkyl groups and acrylic acid or methacrylic acid and is crosslinked with a polyisocyanate which is the biuret of hexamethylene diisocyanate.

10. The coated flexible substrate of claim 1 in which
a. the foamed layer is of a polyethylene foam.
b. the top layer is an ionomer resin of a copolymer of 75–98% by weight of ethylene and 2–25% by weight of methacrylic acid having 10–60% of the carboxylic acid groups ionized with zinc or sodium metal ions,
c. the epoxy primer is a pigmented epoxy hydroxy polyether resin crosslinked with an amine terminated polyamide,
d. the acrylic coating is an acrylic polymer or a blend of acrylic polymers in which the acrylic polymer is of methyl methacrylate or styrene or a mixture thereof, an alkyl methacrylate or an alkyl acrylate having 2–12 carbon atoms in the alkyl groups, a hydroxy alkyl acrylate or a hydroxy alkyl methacrylate having 2–4 carbon atoms in the alkyl groups and acrylic acid or methacrylic acid and is crosslinked with a polyisocyanate which is the biuret of hexamethylene diisocyanate.

11. The coated flexible substrate of claim 1
a. the foamed layer is an ionomer resin is a copolymer of 75–98% by weight of ethylene and 2–25% by weight of methacrylic acid having 10–60% of the carboxylic acid groups ionized with zinc or sodium metal ions;
b. the top layer of ionomer resin is the same as (a) above,
c. the epoxy primer is a pigmented epoxy hydroxy polyether resin crosslinked with an amine terminated polyamide,
d. the acrylic coating is of a crosslinked polyurethane acrylic in which the acrylic polymer has a backbone consisting essentially of polymerized acrylic esters of the group of an alkyl methacrylate or an alkyl acrylate or mixtures thereof each having 1–12 carbon atoms in the alkyl group and having polymerized ethylenically unsaturated ester units that form ester groups pending from the carbon atoms of the polymer backbone and comprise about 10 to 75% of the total weight of the polymer and consisting essentially of ester group (A)

$$-\overset{O}{\underset{\|}{C}}-O-R^1-OH$$

and ester group (B) selected from the group consisting of $$-\overset{O}{\underset{\|}{C}}-O-R^1-O-\overset{O}{\underset{\|}{C}}-R^2-\overset{O}{\underset{\|}{C}}-O-CH_2-\overset{OH}{\underset{|}{C}}-H \quad \overset{O}{\underset{\|}{\phantom{C}}}$$
$$\underset{CH_2-O-C-R^3}{}$$

$$-\overset{O}{\underset{\|}{C}}-O-R^1-O-\overset{O}{\underset{\|}{C}}-R^2-\overset{O}{\underset{\|}{C}}-O-\overset{H}{\underset{|}{C}}-\overset{OH}{\underset{|}{CH_2}} \quad \overset{O}{\underset{\|}{\phantom{C}}}$$
$$\underset{CH_2-O-C-R^3}{}$$

or mixtures thereof, wherein the molar ratio of ester group (A) to ester (B) is from about 1:1.5 to 1:2.5; and wherein
$R^1$ is a saturated hydrocarbon group having 2–4 carbon atoms,
$R^2$ is an aromatic radical,
$R^3$ is a tertiary hydrocarbon group having 8 through 10 carbons atoms, and the acrylic polymer is crosslinked with a polyisocyanate that is the biuret of hexamethylene diisocyanate.

12. The coated flexible substrate of claim 1 in which
a. the foamed layer is of a polyethylene foam.
b. the top layer is an ionomer resin of a copolymer of 75–98% by weight of ethylene and 2–25% by weight of methacrylic acid having 10–60% of the carboxylic acid groups ionized with zinc or sodium metal ions,
c. the epoxy primer is a pigmented epoxy hydroxy polyether resin crosslinked with an amine terminated polyamide,
d. the acrylic coating is of a crosslinked polyurethane acrylic in which the acrylic polymer has a backbone consisting essentially of polymerized acrylic esters of the group of an alkyl methacrylate or an alkyl acrylate or mixtures thereof each having 1–12 carbon atoms in the alkyl groups and having polymerized ethylenically unsaturated ester units that form ester groups pending from the carbon atoms of the polymer backbone and comprise about 10 to 75% of the total weight of the polymer and consisting essentially of ester group (A)

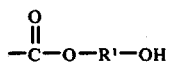

and ester group (B) selected from the group consisting of

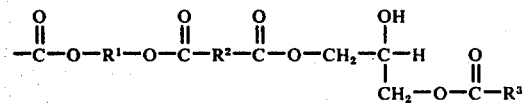

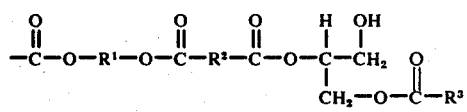

or mixtures thereof, wherein the molar ratio of ester group (A) to ester (B) is from about 1:1.5 to 1:2.5; and wherein
$R^1$ is a saturated hydrocarbon group having 2–4 carbon atoms,
$R^2$ is an aromatic radical,
$R^3$ is a tertiary hydrocarbon group having 8 through 10 carbons atoms, and the acrylic polymer is crosslinked with a polyisocyanate that is the biuret of hexamethylene diisocyanate.

13. The coated flexible substrate of claim 4 in which the substrate is embossed and molded into the shape of an automobile roof.

14. A coated flexible substrate consisting essentially of
   a. a substrate of an ionomer resin of a copolymer of 75–98% by weight of ethylene and 2–25% by weight of methacrylic acid having 10–60% of the carboxylic acid groups ionized with zinc or sodium metal ions;
   b. an epoxy primer layer of a pigmented epoxy hydroxy polyether resin crosslinked with an amine terminated polyamide in firm adherence to the substrate; and
   c. an acrylic coating layer in firm adherence to the primer layer in which the acrylic coating is an acrylic polymer or a blend of acrylic polymers in which the acrylic polymer is of methyl methacrylate or styrene or a mixture thereof, an alkyl methacrylate or an alkyl acrylate having 2–12 carbon atoms in the alkyl groups, a hydroxy alkyl acrylate or a hydroxy alkyl methacrylate having 2–4 carbon atoms in the alkyl groups and acrylic acid or methacrylic acid and is crosslinked with a polyisocyanite which is the biuret of hexamethylene diisocyanate.

15. The coated flexible substrate of claim 14 which is in the shape of a gravel deflector for automobiles and trucks.

* * * * *